United States Patent [19]

Hectors

[11] 3,769,018

[45] Oct. 30, 1973

[54] DIAZOTYPE MATERIALS CONTAINING RESORCINOL MONO(ARYLOXY OR ARYLTHIO)ALKYL ETHERS

[75] Inventor: Adrianus Marie Petrus Hectors, Tegelen, Netherlands

[73] Assignee: Oce-Van der Grinten N.V., Venlo, Netherlands

[22] Filed: May 10, 1971

[21] Appl. No.: 142,059

[30] Foreign Application Priority Data
May 13, 1970 Netherlands................ 7006932

[52] U.S. Cl.................. 96/91 R, 96/49, 96/75
[51] Int. Cl................... G03c 1/58, G03c 1/54
[58] Field of Search............. 96/91 R, 75, 49

[56] References Cited
UNITED STATES PATENTS

| | | | |
|---|---|---|---|
| 2,516,931 | 8/1950 | Von Glahn et al. | 96/91 R |
| 3,113,025 | 12/1963 | Bialczak | 96/91 R |
| 3,573,051 | 3/1971 | Gray | 96/91 R |
| 3,615,575 | 10/1971 | Rauhut | 96/91 R |
| 2,523,889 | 9/1950 | Von Glahn et al. | 96/91 R |
| 2,532,126 | 11/1950 | Slifkin et al. | 96/91 R |
| 2,536,989 | 1/1951 | Von Glahn et al. | 96/91 R X |
| 2,940,852 | 6/1960 | Herrick et al. | 96/91 R |
| 2,970,909 | 2/1961 | Slimowicz | 96/91 R |
| 3,064,049 | 11/1962 | Cox | 96/91 R |
| 3,427,165 | 2/1969 | Champ et al. | 96/91 R X |

FOREIGN PATENTS OR APPLICATIONS 1,080,576  8/1967  Great Britain ............ 96/91 R

*Primary Examiner*—Charles L. Bowers, Jr.
*Attorney*—Albert C. Johnston

[57] ABSTRACT

Resorcinol-mono(aryloxy or arylthio) alkyl ethers, e.g. m-(2-phenoxy-ethoxy)phenol, are. They are non-migrating in diazotype material; when coupled with light-sensitive diazo compounds therein after image-wise exposure of the material they form yellow to orange-yellow, light-stable images having high absorption for U.V. radiation. Compositions of the compounds with diazo compounds and blue-coupling azo couplers, particularly certain monoalkyl-amides of 2-hydroxy-3-naphthoic acid, provide sensitized diazotype film materials which are black-developing and excellently suited for making intermediate film copies to be used in further diazotype copying.

8 Claims, No Drawings

DIAZOTYPE MATERIALS CONTAINING RESORCINOL MONO(ARYLOXY OR ARYLTHIO)ALKYL ETHERS

The present invention relates to new diazotype materials containing resorcinol-mono(aryloxy or arylthio)alkyethers as azo coupling (azo dye-forming) components.

Phenols are commonly used as azo coupling components in both the dyestuff industry and the diazotype reproduction art. Resorcinol and phloroglucinol are phenols frequently used. There is a disadvantage in the use of polyvalent phenols as azo componets, in that the diazo ion can engage (couple) at more than one place in their molecule and, consequently, the formation of mixtures containing considerable quantities of diverse dye-stuffs can hardly be prevented. Phenol itself is seldom desirable, as it is only slightly reactive and it has such a low melting point that upon mixing it with the auxiliary agents required for the coupling process it often becomes fluid already at room temperature. For these reasons, certain phenol derivatives are often used instead of phenols.

Certain resorcinol-monoalkylethers have been proposed for use as azo coupling components in two-component diazotype materials which consist of a support, such as paper or a film, having a thin layer of a mixture of diazo compound(s), azo components(s) and acids applied thereon. After image-wise exposure for destruction of the diazo compound in the areas struck by light, this material is brought into contact with alkali in gaseous or liquid form in order to effect the coupling reaction.

Resorcinol-monoethylether and resorcinol-mono-2-hydroxy-ethylether are examples of known compounds used as azo couplers. The known resorcinol-monoethers are prepared by converting resorcinol with the appropriate alkyl-halide. With the usual diazo compounds they produce azo dyes which usually have a high U.V. absorption, so that they are especially suitable for use in the so-called transparent diazotype materials, or diazotype film materials, for making intermediate copies to be used for further copying on diazotype materials.

Yet the known two-component diazotype materials made with resorcinol-monoalkylethers do not give complete satisfaction. The ethers are hardly ever free from resorcinol. The presence of resorcinol is disturbing because the resorcinol couples more actively than the ether and, depending upon the reaction conditions, produces mono- or bis-azo dyes which can cause annoying differences of azo dye shades to occur during the development of the material. Moreover, resorcinol is volatile and has a so-called migration tendency, which means that it may change in form or location under the influence of moisture and/or warmth, with attendant change of the reactive mixture or of its homogeneity. Moreover, the common resorcinol-monoalkylethers themselves exhibit a migration tendency and volatility, so that they too contribute to a change of the reactive mixture. This change manifests itself, for instance, in the U.V. absorption and in the shade of the azo dye when copies made from a freshly produced diazotype material are compared with copies made from aged material. Furthermore, both the azo dyes made with resorcinol and those made with such resorinol-monoalkylethers have a migration tendency which can cause aged copies to show a blurred or unsharp image.

The purpose of the present invention is to overcome the disadvantages involved with the use of the common resorcinol-monoalkylethers. According to this invention, it has been found that certain compounds belonging to the class of resorcinol-monoalkylethers exhibit properties which make them eminently suitable for use as an azo coupling component in diazotype material that is to be used for making intermediate copies.

The compounds used according to the invention are resorcinol-mono(aryloxy or arylthio)alkyl ethers having the general formula:

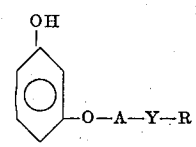

in which R is a substituted or non-substituted aryl radical free from hydroxyl, thiol and amino groups directly bound to the nucleus, and also from secondary and tertiary nitrogen atoms bearing an aliphatic hydrocarbon group, Y is a sulfur or oxygen atom and A is an alkylene radical having two to six carbon atoms in a chain linking the ether oxygen atom to Y.

The aryl radical R may be naphthyl or phenyl but preferably is phenyl. Substituents present in it are chosen in such a way that, upon coupling, the diazo ion does not enter this radical; so it does not in any case carry a hydroxyl or a thiol group or any amino group that is either the free amino group or a secondary or tertiary amino group. On the other hand, the presence of a phenylamino, acylamino or sulfonamido substituent on the aryl radical is practicable, because in these groups the nitrogen atom is considerably less electropositive than it is in the case where an aliphatic hydrocarbon residue is bound directly to it. While the presence of a free carboxyl or sulfonic acid group on the aryl radical is in general not favorable for the water-resistance of the azo dye formed, this fault can be counteracted in known manner by esterification or amidation of such a group.

Without any detriment, the aryl radical can in any case be substituted so as to carry thereon one or more halogen atoms or alkyl or alkoxy groups. A halogen substituent should preferably be fluorine, chlorine or bromine. Light alkyl and alkoxy groups, each having from one to four carbon atoms, are preferred to the heavier groups as aryl radical substituents.

The resorcinol-mono(aryloxy or arylthio) alkyl ethers used as herein set forth enable the above described disadvantages of the common resorcinol-monoalkyl ethers to be overcome satisfactorily. The compounds are crystalline and are not volatile. They can be prepared excellently, in a pure resorcinol-free condition, by a method known for the preparation of resorcinol-monoethers. When used with the diazo compounds commonly employed in two-component diazotype materials they form azo dyes which migrate considerably less than do the azo dyes formed with these diazo compounds, by resorcinol and the common resorcinol-monoalkylethers.

As regards other properties, the compounds compare favorably with the known analogous compounds, for instance, they also form yellow to orange-yellow light-stable azo dyes which possess a high absorption for U.V. radiation.

The compounds to be employed may be prepared according to the following reaction scheme:

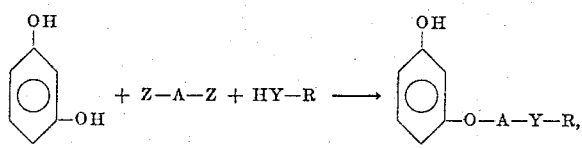

wherein Z represents a halogen atom, preferably bromine, and A, Y and R have the meanings stated hereinbefore. The alkylene dihalide is first brought into reaction with the resorcinol or with the HY-R compound, and then the product obtained from this reaction is converted with the other reactant. The resorcinol-monoethers made in this way can easily be recovered free from resorcinol.

The alkylene dihalide may be, for example: 1,2 dibromoethane; 1,3-dibromopropane; 1,2-dibromopropane; 1,4-dibromobutane; 1,3-dibromobutane; 1,5-dibromopentane; 1,6-dibromohexane.

Reaction component HY-R is a phenol or a naphthol, or a phenyl or naphthyl mercaptan, which does not contain in the molecule a second group, such as an —OH or —SH group, reactive to the alkylene dihalide.

Examples of suitable reaction components of this type are: phenol; 2-bromophenol; 3-bromophenol; 4-bromophenol; 2-chlorophenol; 3-chlorophenol; 4-chlorophenol; 2-fluorophenol; 3-fluorophenol; 4-fluorophenol; 2-methylphenol; 3-methylphenol; 4-methylphenol; 2-ethylphenol; 4-ethylphenol; 4-butylphenol; 2-tert.butylphenol; 3-trifluoromethylphenol; 2-acetaminophenol; 3-acetaminophenol; 4-acetaminophenol; 2-allylphenol; 2-phenolphenol; 4-phenylphenol; 2,3-dichlorophenol; 2,4-dichlorophenol; 2-bromo-4-chlorophenol; 2,3-dimethylphenol; 2,4-di-tert.butylphenol; 2-tert.butyl-4-methylphenol; 2-tert.butyl-6-methylphenol; 4-tert.butyl-2-methylphenol; 2-allyl-6-methylphenol; 4-chloro-2-methylphenol; 4-bromo- 2,6-dichlorophenol; 2-bromo-4,5-dimethylphenol; 4-chloro-2,6 -dimethylphenol; 2-methyl-4-bromo-6-chlorophenol; 2,3,5-trimethyl-phenol; 4-allyl-2,6-dimethoxyphenol; 1-naphthol; 2-naphthol; 1-bromo-2-naphthol; 6-bromo-2-naphthol; 4-chloro-1-naphthol; 6-methyl-2-naphthol; 7-methyl-2-naphthol; 4-ethyl-1-naphthol; 1-hydroxy5-naphthalenesulfonamide; 1-methoxy-2 -naphthol; 4-methoxy-1-naphthol; 5-methoxy-1-naphthol; 4-ethoxy-1-naphthol; phenylmercaptan; 2-tolylmercaptan; 3-tolylmercaptan; 4-tolylmercaptan; 4-chlorophenylmercaptan; 4tert.butylphenyl-mercaptan; 4-methoxyphenylmercaptan; 4-methoxy- 2-methylphenylmercaptan; 1-naphthylmercaptan; 2-naphthylmercaptan; 4-bromo-1-naphthylmercaptan; 8-bromo-1-naphthylmercaptan; 4-chloro-1-naphthylmercaptan.

Among the compounds to be used according to the invention, the ones preferred are those in which R is a substituted or non-substituted phenyl radical as described above and Y is an oxygen atom. When used with the usual diazo compounds in two-component diazotype material these conpounds form yellow to orange azo dyes which have a high U.V. absorption and do not lose this high U.V. absorption upon prolonged exposure to U.V. radiation, or as a result of bleaching-out or darkening of the azo dye.

The following are illustrative examples, though not a complete enumeration of the effective resorcinol-monoalkylethers: m-(2-phenoxyethoxy)phenol; M[3-(4-chlorophenoxy)propoxy]phenol; m-[2(2-bromophenoxy)ethoxy]phenol; m-[2-(4-N-acetaminophenoxy) ethoxy]phenol; m-[2-(2,4-dichlorophenoxy)ethoxy]phenol; m-[4-(2,3-dimethylphenoxy)butoxy]phenol; m-[2-naphthyloxy-(1)ethoxy]phenol; m-[2-(4-tolylthio)ethoxy]phenol; m-[2-(4-methoxyphenylthio)ethoxy]phenol; m-[2-(4-tert.butylphenylthio)ethoxy]phenol; m-[2-(4-chloronaphthylthio-1)ethoxy]phenol.

Such resorcinol-monoethers can be used for the preparation of two-component diazotype material, either individually or in mixtures or mixed with other azo coupling components. They are especially advantageous for use in two-component diazotype film material, by which is meant a light-sensitive material having the light-sensitive diazo compound taken up in a hydrophobic or hydrophilic film that either is self supporting or has been applied durably onto a support-material, as by laminating the film with the support material or by forming it on the support material as a so-called film layer. The diazotype film material can for instance be a transparent diazotype film for making intermediate copies. During the manufacture of such a transparent diazotype film a resorcinol-monoether herein disclosed may be mixed with a small quantity of a blue-coupling azo component, in order to augment the visual contrast of the azodye images obtained upon development of the film after imagewise exposure thereof.

Two-component diazotype materials often contain mixtures of azo couplers in order to provide the required image color upon development. Materials which must develop to form very dark azo dyes, for instance black, normally contain a mixture of an azo component that couples yellow with the diazo compound and an azo component that couples blue with it. A precise selection of the various compounds and of the mutual proportions in which they are used makes it possible to obtain a mixture of blue and yellow azo dyes which looks neutrally black to the eye.

By use of the resorcinol-monoethers herein disclosed in combination with a suitable blue-coupling azo component and a diazo compound usually employed in two-component diazotype material, a black-developing diazotype film material of excellent quality can be manufactured.

As a blue-coupling component, any of the known blue-coupling azo couplers can be used, such as: dihydroxynaphtha-lenes, e.g. 2,3-dihydroxynaphthalene; amides of 2-hydroxy-3-naphthoic acid, e.g. monoalkyl- and monoarylamides, especially monoalkylamides in which the ω-carbon-atom of the alkyl radical is substituted by a hydroxyl group, a primary, secondary or tertiary amino group or a saturated heterocyclic amino group; amides of 1-hydroxy-4-methyl-8-naphthalene sulphonic acid, for instance, monoalkylamides thereof having the alkyl radical substituted as described above; and monarylamides.

For the blue-coupling effect, it has been found especially advantageous to use monoalkylamides of 2-hydroxy-3-naphthoic acid having the structure:

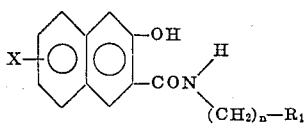

in which X is a hydrogen or halogen atom or an alkoxy group, n is 2, 3 or 4 and $R_1$ is a hydrogen atom, a hydroxy group or a group

in which $R_2$ and $R_3$ are the same or different and each is a hydrogen atom or an alkyl group, or in which $R_2$ and $R_3$ together with the nitrogen atom to which they are bound form a saturated, heterocyclic ring.

When these blue-coupling compounds are used in the correct weight-proportion in relation to the yellow-coupling compounds herein disclosed, black-developing diazo-type film materials are obtained which, both in fresh and in aged condition, develop into a constantly evenly shaded azo dye mixture, and which in partially exposed image areas show no disturbing shade deviating from the shade of the unexposed areas.

The diazo compounds suitable for the practice of the invention are especially those derived from a p-phenylenediamine. Examples of such diazo compounds are:
4-diazo-N,N-dimethylaniline
4-diazo-N,N-diethylaniline
4-diazo-N,N-di-n-propylaniline
4-diazo-N-ethyl-N-(2'-hydroxy)ethylaniline
N-(4-diazophenyl)morpholine
N-(4-diazo-2,5-dimethoxyphenyl)morpholine
N-(4-diazo-2,5-diethoxyphenyl)morpholine
N-(4-diazophenyl)piperidine
N-(4-diazo-2,5-dimethoxyphenyl)piperidine
N-(4-diazo-2,5-diethoxyphenyl)piperidine.

Diazo compounds found particularly advantageous for this purpose are the N-(4-diazo-2alkylphenyl) pyrrolidines. In combination with the resorcinol-monoethers and the blue coupling compounds mentioned above, these diazo compounds are suitable for preparing black-developing diazo-type film materials which yield copies having neutrally black images and having very good U.V. absorption both in the non-exposed and the partially exposed image areas. When these copies are sufficiently transparent, they serve excellently as intermediate originals for making further copies, for instance on diazotype material.

The usual diazotype auxiliary agents may be present in the diazotype film manufactured with the resorcinol-monoethers, such as acids, e.g. citric acid or tartaric acid; metal salts, e.g. zinc chloride or stannic chloride; and other auxiliary agents, such as sulphosalicylic acid, urea, thiourea, polyethyleneglycols, glycerol and suchlike.

The diazotype film may also contain ultraviolet radiation absorbing compounds or blue to violet fluorescent optical brighteners to soften the gradation of the film and to make it useful for reproduction of half-tones and for microfilm. Examples of such agents are Uvinul 490, nitro-aniline sulphonic acid, sulphonic acids of acridone and fluorenone, stilbene derivatives, triazole derivatives, etc. Many others can be found in the literature, for example in British Patent Specifications 1,094,374, 1,059,856 and 1,111,439 and in U.S. Pat. No. 3,365,296.

The diazotype film material can be manufactured by impregnating a film support or a film layer applied on a suitable support with a solution of the diazo compound, the azo components(s) and the auxiliary agents; or by coating a support with a liquid which contains the diazo compound, the azo component(s) and the auxiliary agents together with a film-forming polymer and subsequently drying the coating. Among suitable film supports are polyethyleneterephthalic film, polycarbonate film, and cellulose acetate film that is either non-hydrolysed or hydrolysed superficially.

A film layer can, for instance, consist of a cellulose ester such as cellulose acetate, cellulose propionate, cellulose acetate propionate or cellulose acetate butyrate; or a polyvinyl ester such as polyvinylacetate. A hydrophylic film layer can, for instance, be obtained by hydrolysing superficially a layer of a cellulose ester or a polyvinyl ester. Not only the film supports mentioned but also other materials can be used as supports, for example: paper, transparentized paper, naturally transparent paper, glass-fabric impregnated with polyester-resin and metal foil.

The practice of the invention is further illustrated by the following examples:

EXAMPLE I

A cellulose acetate butyrate film layer weighing 20 g/m² and anchored on a polyethylene terephthalate film is impregnated with a solution of the following composition:
15 g of 3-methyl-4-pyrrolidinyl benzene diazonium tetrafluoroborate
2.4 g of 4-N.N-diethylamino benzene diazonium tetrafluoroborate
3.5 g of sulphosalicylic acid
36 g of m-(2-phenoxyethoxy)phenol
20 g of citric acid
30 g of thiourea
20 g of zinc chloride
100 ml of water and
330 ml of methylglycol acetate in
2-methoxy ethanol up to 1,000 ml, and then is dried.

The diazotype film material thus obtained is image-wise exposed beneath a transparent ink drawing until all diazonium compound under the clear portions of the drawing has completely bleached out. The image-wise exposed film then is developed in ammonia vapor.

The copy shows a strong orange-yellow image on a clear background. It is eminently useful as an intermediate for further copying on diazotype material.

Equivalent results are obtained when the 36 g of m-(2-phenoxy ethoxy)phenol in the above sensitizing solution is replaced by an equimolar amount of m-[2-(2-bromophenoxy) ethoxy]phenol, m-[3-(4-chlorophenoxy)ethoxy]phenol, m-[2-(4-N-acetaminophenoxy)ethoxy]phenol or m-[2-(4-methoxy phenoxy)ethoxy]phenol.

EXAMPLE II

A cellulose acetate film is impregnated with a solution of the following composition:
26 g of 3-methyl-4-pyrrolidinyl benzene diazonium tetrafluoroborate
4 g of 4-N.N-dimethylamino benzene diazonium tetrafluoroborate 31 g of m-[2-(4-tolylthio)ethoxy]phenol
15 g of tartaric acid
10 g of thiourea
10 g of zinc chloride
100 ml of water and
330 ml of methly glycol acetate in
2-methoxy ethanol to make 1,000 ml, and then is dried.

The diazotype film thus obtained is imagewise exposed and developed as described in example I. The copy shows a strong yellowish image on a clear background. It is very useful as intermediate for further copying on diazotype material.

Equally good results are obtained when the 31 g of m-[ 2-(4-tolylthio)ethoxy]phenol in the above sensitizing solution is replaced by an equimolar quantity of m-[4-(2,3-dimethylphenoxy)butoxy]phenol, m-[2-(4-methoxyphenylthio)ethoxy]phenol, m-[2-(4-tert.butyl phenylthio)ethoxy]phenol or m-(2-naphthyloxy(1) ethoxy)phenol.

Instead of the named diazonium salts, the above sensitizing solution may contain an equimolar amount of other diazonium salts, such as 4-N-methyl-N-benzylamino-2,5-dimethoxy benzene diazonium tetrafluoroborate, 4-morpholino-2,5-diethoxy benzene diazonium tetrafluoroborate, 4-N-ethyl-N-(2'-hydroxyethyl) amino benzene diazonium tetrafluoroborate, or 4-piperidino-2,5-diethoxy benzene diazonium tetrafluoroborate.

EXAMPLE III

A cellulose acetate film layer of about 20 g/m² in weight, coated on a supercalendered paper of weight 150 g/m², is impregnated with a solution of the following composition:
11.5 g of 4-N.N-diethylamino benzene diazonium tetrafluoroborate
15 g of citric acid
10 g of sulphosalicylic acid
5 g of N-(2-aminoethyl)-3-hydroxy-2-naphthamide
17 g of m-(2-phenoxy ethoxy)phenol
100 ml of water and
350 ml of methyl glycol acetate in
2-methoxy ethanol to make, 000 ml, and then is dried.

The diazotype film material thus obtained is imagewise exposed beneath a transparent ink drawing until all diazonium compound under the clear portions of the drawing has completely bleached out. The exposed film is developed in ammonia vapor. The copy shows a strong black image on a clear, white background. I claim:

1. Diazotype material comprising a light-senstive film in the form of a self-supporting film or in the form of a film layer on a supporting material, said film containing a light-sensitive p-amino benzene diazonium salt, an acidic stabilizer and a resorcinol monoether having the structure

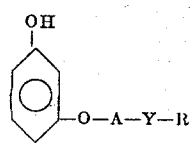

in which:

A is an alkylene radical having two to six carbon atoms in a chain linking the ether oxygen atom to Y;
Y is an oxygen or sulfur atom; and
R is a non-substituted aryl radical or an aryl radical having thereon no hydroxyl, thiol or primary amino group nor any secondary or tertiary nitrogen atom bound to an aliphatic hydrocarbon group but having thereon one or more substitutents selected from the group consisting of halogen atoms and lower alkyl, lower alkoxy, aryl, acylamino, phenylamino, carboxyl, sulfonic acid, carbonamide and sulfonamide groups.

2. Two-component diazotype material comprising a light sensitive film in the form of a self-supporting film or in the form of a film layer on a supporting material, said film containing a light-sensitive p-amino benzene diazonium salt, an acidic stabilizer, a blue-coupling azo component and a yellow-coupling azo component, said blue-coupling azo component being a compound of the formula

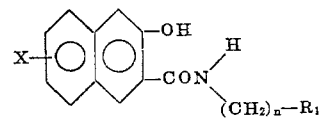

in which
X is a hydrogen or a halogen atom or an alkoxy group,
$R_1$ is a hydrogen atom, a hydroxy group or a

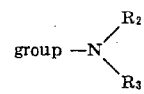

in which $R_2$ and $R_3$ are the same or
different and each is a hydrogen atom or an alkyl group, or in which $R_2$ and $R_3$ together with the nitrogen atom to which they are inked form a saturated heterocyclic ring, and
$n$ is 2, 3 or 4; and
said yellow-coupling azo component being a compound of the formula

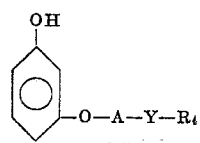

in which
A is an alkylene radical having two to six carbon atoms in a chain linking the ether oxygen atom to Y,
Y is an oxygen or sulfur atom, and
$R_4$ is a non-substituted aryl radical or an aryl radical having thereon no hydroxyl, thiol or primary amino group nor any secondary or tertiary nitrogen atom bound to an aliphatic hydrocarbon group but having thereon one or more substituents selected from the group consisting of halogen atoms and lower alkyl, lower alkoxy, aryl, acylamino, phenylamino, carboxyl, sulfonic acid, carbonamide and sulfonamide groups.

3. Two-component diazotype material according to claim 2, wherein Y is an oxygen atom and said aryl radical is a phenyl radical having thereon no mercapto group.

4. Two-component diazotype material according to claim 2, wherein said aryl radical is a phenyl radical having thereon no mercapto group but having substituted thereon at least one halogen atom or at least one alkyl or alkoxy group having one to four carbon atoms.

5. Two-component diazotype material according to claim 2, said yellow-coupling azo component being m-(2-phenoxyethoxy)phenol; m[3-(4-chlorophenoxy)-propoxy]phenol; m-]2-(2-bromophenoxy)ethoxy]-phenol; m-[2-(4-acetaminophenoxy)ethoxy]phenol;m-[2-(2,4-dichlorophenoxy)ethoxy]phenol; m-[4-(2,3-dimethylphenoxy)butoxy]phenol; m-[2-naphthyloxy-(1) ethoxy]phenol; m-[2-(4-tolylthio)ethoxy]phenol; m-[2-(4-methoxyphenylthio) ethoxy]phenol; m-[2-(4-tert.butylphenylthio)ethoxy]phenol; or m-[2-(4-chloronaphthylthio-1)ethoxy]phenol.

6. Two-component diazotype material, according to claim 8, said yellow-coupling azo component being m-(2-phenoxy-ethoxy) phenol.

7. Two-component diazotype material according to claim 8, said diazonium salt being a 3-alkyl-4-pyrrolidinyl benzene diazonium salt.

8. Two-component diazotype material according to claim 8, that forms a strong black image on a clear background, said diazo compound being a 4-diethylamino benzene diazonium salt, said blue-coupling azo component being N-(2-aminoethyl)-3-hydroxy-2- naphthamide, and said yellow-coupling azo component being m-(2-phenoxy-ethoxy) phenol.

* * * * *

UNITED STATES PATENT OFFICE
CERTIFICATE OF CORRECTION

Patent No. 3,769,018                   Dated October 30, 1973

Inventor(s) Adrianus M. P. Hectors

It is certified that error appears in the above-identified patent and that said Letters Patent are hereby corrected as shown below:

Abstract, line 2, delete "are. They";

Column 1, line 7, "o)alkyethers" should read -- o)alkylethers --;

Column 1, line 13, "componets" should read -- components --;

Column 4, line 6, "M[13-" should read -- m[3- --;

Column 4, line 54, "droxynaphtha-lenes" should read -- droxynaphthalenes --;

Column 6, line 6, "components(s)" should read -- component(s) --;

Column 10, line 6, "8" should read -- 2 --;

Column 10, line 9, "8" should read -- 2 --;

Column 10, line 12, "8" should read -- 2 --.

Signed and sealed this 21st day of May 1974.

(SEAL)
Attest:

EDWARD M.FLETCHER,JR.                C. MARSHALL DANN
Attesting Officer                    Commissioner of Patents